United States Patent Office 3,366,600
Patented Jan. 30, 1968

3,366,600
PROCESS FOR PREPARING AMINE-PHENOL CURING AGENT EPOXY RESIN COMPOSITIONS
Richard J. Haberlin, Weston, Mass., and Gustav W. Steinhilber, Lebanon, Conn., assignors to W. R. Grace & Co., Cambridge, Mass., a corporaiton of Connecticut
No Drawing. Continuation-in-part of application Ser. No. 751,822, July 30, 1958. This application June 2, 1964, Ser. No. 372,106
8 Claims. (Cl. 260—47)

This invention relates to compositions of matter containing amine-cured epoxy resins. The compositions are useful as adhesives and sealing material, and are particularly adapted for bonding cold-rolled steel, glass, phenolic resins, and hard rubber to produce a seal which is tough, long-lasting and resistant to variation in temperature.

This application is a continuation-in-part of copending application, Ser. No. 751,822, filed July 30, 1958, now abandoned.

Polyfunctional primary and secondary amines are well-known crosslinking or curing agents for epoxy resins. The following reactions are possible between amines and epoxy resins:

(1) Reaction between epoxy group and primary amine to form a secondary amine:

(2) Reaction between epoxy group and secondary amine to form a tertiary amine:

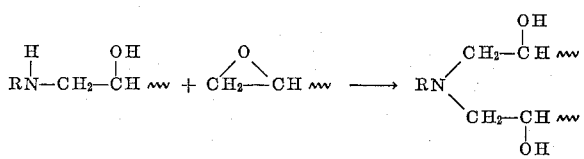

Theoretically, it is also possible for the hydroxyl group formed in reactions (1) and (2) to react with epoxy groups, but in practice this reaction takes place only to a very small extent and is of little significance in the curing of epoxy resins.

The amine curing agents are added to the resin in approximately stoichiometric amounts. The usual method of calculating the amount of curing agent is to allow one epoxy group for each active hydrogen of the reagent. In a typical calculation for diethylene triamine and an epoxy resin, e.g., "Epon 828," which is a glycidyl polyether of bis (4-hydroxy phenyl) dimethyl methane (hereinafter termed "Bisphenol A") having a molecular weight of about 400, and an epoxy equivalent of 200, it is considered that one-half the gram molecular weight (200 grams) of resin would contain 1 gram mole of epoxy. Diethylene triamine has five active hydrogens and a molecular weight of 105. One-fifth the gram molecular weight (21 grams) would contain 1 gram mole of active hydrogen. As a result, 21 grams of amine will provide one reactive point for each 200 grams of resin, or approximately 10 parts of amine per 100 parts of resin will be required. This ratio of curing agent to resin is fairly typical of ratios encountered in the amine-curing of epoxy resins. Depending on the resin used and the curing agent, the ratio will ordinarily vary from about 5 to about 18.5 parts per 100 parts of resin.

Because cure of the resin begins immediately after the curing agent is added to the resin, it is necessary that the resin and curing agent be packaged separately and mixed immediately prior to use. For this reason, epoxy resin compositions utilizing amine curatives are ordinarily supplied to the user in the form of so-called "two-component compositions." The resin comprises one component and the curing agent makes up the other. Either or both components may contain fillers or other modifying agents.

It has been found in practice that it is difficult, when measuring and mixing two components in such widely differing amounts as the 90/10 ratio described above, to obtain an accurately controlled and perfectly mixed composition. For one thing, there is a very large change in composition of the finished product with even a small variation in the amount of the smaller of the two components. It will be seen, therefore, that a fairly small error in weighing out the curing component could result in a drastic change in properties in the finished composition and could even make it unsuitable for use. In addition, in spite of great care in mixing, it has frequently been found that some portions of the resin composition contain an excessive amount of curing agent, while others do not have enough. Unsatisfactory, variable properties in the finished resin are the inevitable result.

The ideal two-component composition would be one in which the two components are equal in specific gravity and viscosity, and in which the desired composition of the finished product could be obtained by mixing equal weights and equal volumes of the two components. This ideal might be approached by incorporating in the curing agent component an additive in a sufficient quantity so that the total weight of the curing component would more nearly equal the weight of the resin component. The type of additive best suited for the purpose is the class of liquid materials usually called "diluents" for epoxy resin materials, which are added to the uncured resin compositions in order to decrease the viscosity and allow high amounts of filler to be employed. The most important consideration in the final selection of the additive to be employed, however, is that the properties of the cured resin be maintained. The additive must not impair in any way such properties as toughness and heat-resistance and must be of such a nature that it does not "weep" or "bleed" out of the resin composition. It would also be desirable for the additive to be inexpensive enough so that it tends to lower rather than to increase the cost of the resin composition.

There are two types of diluents which are ordinarily used in epoxy resin compositions. Reactive diluents are those materials which contain reactive groups (usually epoxy) which react with the polyfunctional amine curing agent and become an integral part of the cured resin. Phenyl glycidyl ether and butyl glycidyl ether are typical examples of this type of diluent. These materials cannot be used as extenders for the curing agent, since they would react immediately with the amine, forming gelled products which would be unsuitable for use as resin diluents. Non-reactive diluents, on the other hand, do not contain any chemical groupings which serve to bind them into the resin. They are, therefore, sometimes driven out of the resin during cure, consequently increasing the shrinkage and decreasing the adhesive qualities of the resin. Hexylene glycol and xylene are representative of the non-reactive diluents.

Both types of diluents described above have the common drawback that they so seriously interfere with the properties of the cured resin that they must be used in relatively small amounts. It is ordinarily recommended that not more than 15 parts by weight of diluent be used for every 100 parts of resin. These materials are not suitable, therefore, for addition to the curing component in sufficient quantity to make its weight equal to that of the resin component.

It is an object of our invention to discover an additive for epoxy resin compositions which may be mixed with the curing agent of a two-component composition in very substantial amounts. More specifically, our invention has for its object to discover an additive which will make possible the production of a "50–50 two-component composition" or, in other words, a composition in which the curing component and the resin component are mixed together in approximately equal weights and volumes. A still further object of our invention is the addition to epoxy resin compositions of a material which will lower the cost of such compositions without impairing any of their desirable properties, and which will even improve the properties of the epoxy resin compositions.

We have discovered a class of additives for epoxy resin compositions which may be added to the curing agent for such resin compositions in very substantial amounts without in any way impairing the desirable characteristics of the cured resins. By using these additives as a part of the curing component, we are able to produce the very desirable "50–50 two-component compositions," thus facilitating the handling and mixing of the two components.

The additives which we use in the curing agent component to produce the resin compositions of our invention are activated phenols, and include phenol and substituted phenols wherein the substituent groups are of such a nature that they serve to activate the phenolic hydrogen of the compound, that is the substituents on the phenolic ring assist the stabilization of the anionic form either through hyperconjugation or the inductive effect. As examples of such activated phenols there may be mentioned chlorophenol and such o-, m- or p-alkylated phenols wherein each alkyl substituent contains 1 to 10 carbon atoms, such as, nonyl phenol, cresols, guaiacol and carvacrol. Activated phenols have in the past been added to amine epoxy resin compositions in trace amounts (0.2% to 0.5% of the weight of the resin) for the purpose of accelerating the amine reactions shown in Equations 1 and 2. It has not, however, been appreciated that large quantities of these phenols would serve any useful function in the resin compositions.

The curing agents employed are preferably amines and mixtures of amines having the following structure:

where $n$ is an integer having a value of 1 to 6, $p$ has a value of 0 to 6, R is hydrogen or a lower alkyl group having 1 to 4 carbon atoms, such as methyl, ethyl, propyl and butyl, said amine or mixtures thereof having at least two active hydrogens. Illustrative amines include ethylene diamine, diethylene triamine, triethylene tetramine, tetraethylene pentamine, and 3-diethylamino-1-propylamine.

Epoxy resins suitable for use in the present invention are the liquid condensation products of a glycidyl ether and a polyhydric phenol, such as an epihalohydrin, e.g., epichlorohydrin, with bis (4-hydroxyphenyl) dimethyl methane having an epoxy equivalent between about 170 and 280. Examples of useful epoxy resins include "Epon Resins" 828, 830, and 834, "Araldite" 6005, "Dow Epoxy Resins" 331 and 334, "Epirez" 509, and the like.

Our invention will be more clearly understood by reference to the following examples:

EXAMPLE I

The curing agent component of an epoxy resin composition, Component A, was made as follows: 20 parts of nonyl phenol was placed in a container and agitated with a paddle mixer. 10 parts of asbestine was then added in four portions, with thorough stirring after each addition. Following the addition of the asbestine, 4.5 parts of diethylene triamine was slowly stirred in. During this addition, heat was evolved, and fumes of amine were given off. Great care must be exercised during the addition of the amine to avoid breathing the fumes and also to keep the temperature from exceeding 120° C. in order to keep the amine from boiling off. 14 parts of asbestine was then stirred in and stirring was continued until the mixture was homogeneous. Finally, 0.145 part of cadmium yellow was added and stirred in until there were no surface lines. Component A was then vacuum stirred and packaged in a lined container.

The resin component, Component B, was made as follows: 30 parts of the Shell Chemical Corporation epoxy resin "Epon 828" was placed in a container and agitated with a paddle mixer. 16 parts of asbestine was added slowly, in 4 portions, sufficient time being allowed between additions for the mixture to become homogeneous. After the final portion of asbestine had been added and the mixture was homogeneous, 0.4 part of phthalocyanine blue was added and stirred in until no surface lines were visible. Component B was packaged in an unlined container.

The following procedure was used for mixing Components A and B: Components A and B were placed in the tanks of a two-component mixer, a machine designed to deliver equal volumes of two materials to a common mixing chamber. After thorough mixing of the two components, the resulting adhesive composition was sufficiently fluid so that it could be applied through a nozzle to the pieces which were to be joined.

The composition of Example I was applied to two pieces of butadiene-styrene reclaimed rubber 2.5 cm. wide, 7.6 cm. long, and 0.48 cm. thick, and the two pieces were cemented together over an area 2.5 cm. square. The cemented pieces were heated to 70° C. and then allowed to stand for 10 minutes at room temperature, after which the bond was tested in a Scott tester with 50 cm. per minute vertical travel. It was found that the plastic material broke while the bond still remained intact. Cure could also be effected at room temperature in about 1 hour, with development of the same bond strength.

Cemented strips prepared in the same fashion were immersed in sulfuric acid of 1.3 specific gravity for 1 year and then tested for bond strength. The bond strength was found to be equally as high as that of the freshly cemented samples described above. In another test, cemented strips were subjected to temperatures of −40° C. and 150° C. alternately for 20 cycles of 2 minutes each and the bond strength tested as above. The bond strength was not at all impaired by the temperature variation.

Although the ratio of additive to resin in Example I was 20/30, or 66⅔ parts of additive to 100 parts of resin, the properties of the cured resin were in no way impaired by the presence of the additive. Certain properties, such as adhesion and impact resistance, were even improved. The cost of the resin composition was substantially reduced by the use of the relatively inexpensive nonyl phenol, and the problems involved in measuring and mixing the two components were most satisfactorily solved.

The nonyl phenol of Example I reacts with the diethylene triamine curing agent to form a salt. There is definite evidence of the reaction between the phenol and the amine in the fact that when the two are mixed together, a deep red color develops and considerable heat is evolved. By stoichiometric calculation, it will be seen that only 3 grams of diethylene triamine are sufficient to combine with the 20 grams of nonyl phenol, which leaves 1.5 grams of free diethylene triamine in the curing agent component. When the two components of Example I are mixed, the 1.5 grams of unreacted diethylene triamine initiate the reaction between the resin and the amine as represented by Equation 1. While this amine-epoxy reaction is taking place, a substantial exotherm is generated, raising the temperature of the mix to about 70° C. At this temperature, the salt which has been formed by the reaction of the diethylene triamine slowly decomposes, producing additional free curing agent and nonyl phenol. Diethylene triamine is thus released as it is needed for the completion of reaction 1. At the same time, the secondary amine which has been formed in reaction 1 combines with the remaining epoxy groups as shown in Equation 2, forming a polymer of complex, crosslinked structure. The nonyl phenol which has been released accelerates the crosslinking of the resin as described above.

The amount of amine curing agent needed for reaction with the epoxy resin is 3 grams, leaving an excess of 1.5 grams of curing agent in the composition. As the cure progresses to completion, this amount of amine reacts with 10 grams of the nonyl phenol to form a salt. The remaining 10 grams of free phenol remain in the cured resin and act as a plasticizer for the resin.

In formulating the compositions of our invention, we may use enough curing agent so that all the activated phenol is present as the amine salt in the cured resin, or we may, as in Example I, use a lesser amount of curing agent so that some of the phenol is free to act as a plasticizer in the finished composition. We have found, however, that in order to avoid loss of phenol from the cured resin, a substantial amount of the activated phenol must be in the form of the phenol-amine salt in the finished resin composition. The reaction product between the phenol and the amine is held securely in the cured resin and has no tendency to "weep" or "bleed" out of the resin. Furthermore, the phenol-amine salt also has the effect of holding rather large quantities of free phenol in the resin, thus making it possible to take advantage of the plasticizing effect of the phenol. For example, we have found that only about 10 parts of phenol per 100 parts of resin may be held in a resin composition without weeping when all the phenol is present in the unreacted state. When, however, there is a substantial amount of the phenol-amine salt present, much larger amounts of free phenol, up to 30–40 parts per 100 parts of resin, may be present in the cured resin without weeping. It has been our experience that enough curing agent must be provided so that about 50% of the phenol additive will be present in the cured composition in the form of the phenol-amine salt.

The phenol-amine salt apparently also acts as a filler in the cured resin composition, adding impact resistance and lessening brittleness of the resin.

We believe that the nonyl phenol which is released into the composition by decomposition of the phenol-amine salt during cure not only accelerates the cure but also acts as a wetting agent, permitting better penetration of the composition and wetting of the surfaces to which it is applied, thereby producing a stronger bond.

A further advantage of the compositions of our invention is that we are able to use excess curing agent over the calculated amount, thus assuring that there will always be complete cure of the resin. It has been found in the past that some amine is frequently lost during cure, and that the resulting resins are insufficiently cured. Because the amount of amine volatilized during cure is variable, depending on conditions, it is impossible to add a fixed excess of amine to the composition to make up for this deficiency. Excess amine has the effect of amine-terminating the resin, thus blocking crosslinking, and for this reason it has been the practice to add only a very small excess of curing agent over the stoichiometric amount needed for cure.

If a substantial excess of amine is present during the initial reaction (Equation 1), more than half of the epoxy groups present will be taken up in the formation of secondary amine. There will be fewer epoxy groups present, as a result, to take part in the crosslinking reaction of Equation 2. The resulting resin will be soft and jelly-like due to insufficient crosslinking. In the compositions of our invention, a substantial excess of curing agent may be added, because this excess is bound in the phenol-amine salt and is released slowly during the exotherm generated in the course of reaction 1. Because the decomposition of the phenol-amine salt is slow, at no time is a large enough excess of amine present to prevent the crosslinking reaction 2. Following the cure, the amine and phenol again react to form a salt, and the amine is held in the cured composition in a harmless, nonreactive state.

We have found that the activated phenols may be added to epoxy resin compositions in widely varying amounts without impairing the properties of the cured resin. While we prefer to use an amount of additive which will enable us to make a 50–50 two component mix such as that shown in Example I, we may under varying circumstances use very much smaller or larger amounts of phenol. We have found, however, that amounts of phenol below about 5 parts per 100 parts of resin do not have any plasticizing effect on the resin. In such cases, another type of plasticizer must be added if it is desired to overcome the natural brittleness of the resin. Also, when the amount of phenol exceeds about 80 parts per 100 parts of resin, there is a tendency for the phenol to bleed out of the resin.

A specific feature of our invention is the use of different colors in the two components of the resin composition, making possible a simple visual check on the thoroughness and effectiveness of the mixing operation. When two primary colors are used, such as the yellow and blue of Example I, a third color is produced in the completed resin composition. Thus, mixing of the composition of Example I must be continued until the mixture is an even green with no bands or spots of either yellow or blue.

The use of colored components has another and even greater practical advantage in that it can be used as a visual check on the accuracy with which the proper amounts of the two components are delivered to the mixer. Feeding machines have a tendency to become clogged or obstructed to such an extent that after a period of operation the quantity of material being delivered to the mixer in any given unit of time may be far different from the amount for which the machine was originally set. It is necessary in practice to shut down the mixer two or three times a day and to check the actual amounts of the two components which are being delivered to the mixer. If the quantity of either component delivered is found to be substantially different from that called for by the formulation of the resin composition, there will be serious changes in the properties of the cured resin. Severe losses of material and time are the inevitable result.

We have developed a system for an immediate visual check on the accuracy with which the components are being metered and delivered to the mixer. For this purpose, a color chart has been prepared on which the color of the desired mix is accurately reproduced. If, for example, the machine is set to deliver 50 parts of the liquid resin component of Example I and 50 parts of the liquid curing component of Example I, the completed resin composition will be green which is reproduced on the color chart. Other mixes containing respectively 70, 60, 40, and 30 parts of resin and 30, 40, 60, and 70 parts of curing agent have been made, and the particular shade of green resulting from thorough blending of each has also been reproduced on the color chart. When the operator of the mixing machine wishes to check the accuracy of the composition in the mixer, he simply removes a small sample of material from the mixer and compares it with the colors on the color chart. He is able to tell immediately whether the mix has the proper composition or whether the feeding machinery needs to be adjusted to deliver a greater or lesser amount of either component. It is obvious that this type of accurate visual check represents a real saving in time and eliminates the danger of waste of materials due to improper functioning of the feeding machinery.

EXAMPLE II

A curing agent component was prepared in the same manner as that described in Example I and using the following ingredients:

| | Parts |
|---|---|
| Nonyl phenol | 215 |
| Asbestine | 284 |
| Diethylene triamine | 51.5 |
| Cadmium yellow | 1.75 |

The finished material was allowed to stand for 2 hours at room temperature, after which the viscosity was measured on a Brookfield LVT–5X viscometer with a No. 5 spindle at 6 r.p.m. and a temperature of 25° C. The viscosity of the material was found to be about 40,000.

The resin component was also made by the procedure described in Example I except that a small amount of nonyl phenol phenyl was stirred into the resin before addition of the asbestine in order to adjust the viscosity of the resin component. The following ingredients were used:

| | Parts |
|---|---|
| "Epon Resin 828" | 360 |
| Nonyl phenol | 12.5 |
| Asbestine | 178.5 |
| Phthalocyanine blue | 0.45 |

The viscosity of the resin component was measured and was found to be the same as that of the curing agent component.

The two components were mixed in equal amounts in the same manner as described in Example I.

The composition of Example II was applied through a nozzle to the cover of an automotive battery case, and the cover was then applied to the body of the case. If a rapid cure was desired, the battery cases could be heated to 70° C. A complete bond was formed 10 minutes later. Otherwise, a cure took place in 1 hour at room temperature.

The cured resin was found to form a tough effective seal between the covers and the body of the battery case. The seal was unaffected by exposure to battery acid and by the variations in temperature encountered during operation of the battery. The resin was sufficiently flexible, furthermore, so that the seal was undamaged by the vibration and shocks to which automotive batteries are subjected during use.

EXAMPLE III

A two-component epoxy resin composition was prepared according to the procedure described in Example I, but with the following materials: in the curing component, 2 parts of nonyl phenol and 3.3 parts of diethylene triamine; in the resin component 30 parts of "Epon 828." In order to form the cured resin, the two components were mixed together in a ratio of approximately 17.5 parts of curing agent component to 100 parts of resin component. The cured resin formed a satisfactory adhesive bond, but because it had a rather low impact resistance, was not suitable for those uses in which the bond was subject to vibration or shock.

EXAMPLE IV

A two-component epoxy resin composition was prepared according to the procedure described in Example I, but with the following materials: in the curing component, 24 parts of nonyl phenol and 4.8 parts of diethylene triamine; in the resin component, 30 parts of "Epon 828." The two components were mixed together in a ratio of approximately 96 parts of curing agent component to 100 parts of resin component. In this case, the curing agent component was fluid, and could be mixed very easily with the resin. The viscosities of the two components as well as the properties of the cured resin could be adjusted by the addition of filler to either or both components, in which case the proportions of the two components might have to be adjusted in order to obtain the desired composition of the cured resin. The composition of this example formed an excellent adhesive, particularly characterized by a high degree of impact resistance.

It will be noted that in Example IV the nonyl phenol is present in the proportion of about 80 parts of nonyl phenol to 100 parts of resin. As stated above, this amount of phenol is held within the resin without weeping, but if larger proportions are added, the phenol begins to exude from the cured resin, impairing the adhesive qualities of the bond and increasing shrinkage.

EXAMPLE V

A two-component epoxy resin composition was prepared according to the procedure of Example I and with the following ingredients: in the curing component, 20 parts of m-cresol and 4.5 parts of diethylene triamine; in the resin component, 30 parts of "Epon 828." The two components were mixed together in a ratio of approximately 80 parts of curing agent component to 100 parts of resin component. Cure took place at room temperature in about one hour, and the resulting cured resin formed a tough, adhesive bond, with good impact resistance. There as no weeping of the m-cresol from the cured resin composition.

EXAMPLE VI

A two-component epoxy resin composition using guaiacol as an additive was prepared according to the procedure of Example I. In this instance, 20 parts of guaiacol was mixed with 4.5 parts of diethylene triamine to form the curing component; the resin component was made up of 30 parts of "Epon 828." The components were mixed together in a ratio of approximately 80 parts of curing agent component to 100 parts of resin component. Cure took place at room temperature in about one hour. The cured resin had good impact resistance, formed a tough, adhesive bond, and showed no evidence of weeping of the guaiacol from the cured resin.

EXAMPLE VII (A) A two-component epoxy resin composition was prepared as follows: The curing agent component was prepared in the same manner as that described in Example I but using the following ingredients:

| | Parts |
|---|---|
| Nonyl phenol | 19.4 |
| Asbestine | 25.7 |
| Diethylene triamine | 4.65 |
| Cadmium yellow | 0.18 |

The resin component was also made according to the procedure described in Example I except that a small amount of nonyl phenol was stirred into the resin before the addition of the asbestine. The ingredients used in the resin component were as follows:

| | Parts |
|---|---|
| "Epon Resin 828" | 33.2 |
| Nonyl phenol | 1.15 |
| Asbestine | 15.7 |
| Phthalocyanine blue | 0.04 |

The resin and curing agent components were mixed in equal amounts in the same manner as described in Example I and allowed to cure at room temperature.

The resulting cured resin formed a tough, adhesive bond exhibiting good impact resistance and the flexibility necessary for applications where the resin bond or seal is subject to vibration and shocks.

(B) Other two-component epoxy resin compositions were prepared and cured according to the above procedure. The same curing agent component and the same resin component were used as in (A) except that equal weights of different epoxy resins were substituted for the "Epon 828." The epoxy resins employed in preparing these compositions were condensation products of epichlorohydrin and Bisphenol A and are specifically identified as follows:

| Resin: | Epoxy equivalent |
|---|---|
| (1) "Araldite 6005" | 182–189 |
| (2) "Epi-Rez 509" | 182–189 |
| (3) "Dow Epoxy Resin 330" | 182–189 |
| (4) "Dow Epoxy Resin 334" | 178–186 |

After curing, the resulting resin compositions (1)–(4) were found to possess good impact resistance, good adhesion and generally, the same properties as the cured resin prepared in (A) with "Epon 828" having an epoxy equivalent weight of about 180 to 200.

(C) Another group of two-component epoxy resin compositions was prepared and cured in the same manner described in (A) above. The resin component and the curing agent component were the same as those used in (A) except that different amines were substituted for the diethylene triamine. The particular amines that were employed are set forth below. Also given is the quantity of each amine that was used in parts by weight.

| Amine: | Parts |
|---|---|
| (5) Triethylene tetramine | 5.6 |
| (6) Tetraethylene pentamine | 6.25 |
| (7) Diethylene triamine—2.33; tetraethylene pentamine—3.62 | 5.95 |

The cured resin compositions (5)–(7) prepared in (C) possessed substantially the same properties as the cured resins prepared in (A) and (B). The compositions exhibited good impact resistance and formed tough, adhesive bonds.

From the foregoing examples and discussion, it is readily apparent that the two-component compositions of the present invention greatly facilitate handling and mixing of the components in the respect that the properties of the finished product will not vary significantly with small errors in weighing out the resin and curing agent components. Because the two components are used in substantially equal weights and volumes, the mixing of the ingredients can be accomplished with greater ease and with greater uniformity which avoids over-curing and under-curing of different portions of the resin as found in instances where the weight and volume of the resin component greatly exceeds that of the curing component. Moreover, the amine used to cure the resin may be used in excess to insure complete curing without the adverse effect of blocking crosslinking. The phenolic additive employed with the amine in making the curing agent component, unlike the diluents or extenders ordinarily employed, may be utilized in relatively large amounts without "bleeding" or interfering with the properties of the cured resin. Consequently, cured resins containing substantial amounts of a relatively inexpensive additive may be prepared at a great savings in cost while still having all the desirable properties and many improved properties over the two-component epoxy resin compositions previously employed.

We claim:

1. A process for preparing a curable resin composition which includes
   (A) the steps of forming a curing mixture of an amine-phenol salt by mixing together as the sole salt-producing reactants,
      (1) a monohydric phenol selected from the group consisting of nonyl phenol, chlorophenol, cresol, guaiacol and carvacrol and
      (2) an amine which is a curing agent for epoxy resins in an amount in excess of that necessary to react stoichiometrically with the phenol, said amine having the structure

where $n$ is an integer having a value of 1 to 6, $p$ has a value of 0 to 6, R is selected from the group consisting of hydrogen and lower alkyl groups having 1 to 4 carbon atoms, said amine having at least two active hydrogens,
   (B) and thereafter combining an epoxy resin which is a glycidyl polyether of bis(4-hydroxy phenyl) dimethyl methane with the amine-phenol mixture, said phenol being present in amounts between about 5 to 80 parts by weight per 100 parts of epoxy resin.

2. A process for preparing a curable resin composition which includes
   (A) the steps of forming a curing mixture of an amine-phenol salt by mixing together as the sole salt-producing reactants,
      (1) a monohydric phenol selected from the group consisting of nonyl phenol, chlorophenol, cresol, guaiacol and carvacrol and
      (2) an amine which is a curing agent for epoxy resins in an amount in excess of that necessary to react stoichiometrically with the phenol, said amine being selected from the group consisting of diethylene triamine, ethylene diamine, tetraethylene pentamine, triethylene tetramine, 3-diethylamino-1-propyl amine, and mixtures thereof,
   (B) and thereafter combining an epoxy resin which is a glycidyl polyether of bis(4-hydroxy phenyl) dimethyl methane with the amine-phenol mixture, said phenol being present in amounts between about 5 to 80 parts by weight per 100 parts of epoxy resin.

3. The process of claim 2 wherein the amine is present in an amount which is the sum of the stoichiometric amount necessary to react with the epoxy resin and at least about 50% of the stoichiometric amount necessary to react with the phenol.

4. The process of claim 3 wherein the phenol is nonyl phenol and the amine is diethylene triamine.

5. The process of claim 3 wherein the phenol is nonyl phenol and the amine is a mixture of diethylene triamine and tetraethylene pentamine.

6. The process of claim 3 wherein the phenol is nonyl phenol and the amine is triethylene tetramine.

7. The process of claim 3 wherein the epoxy resin has an epoxy equivalent of about 170 to about 280.

8. A process for preparing a curable resin composition which includes the steps of mixing together about 4.5 parts by weight of diethylene triamine and about 20 parts by weight of nonyl phenol and thereafter combining said mixture with about 30 parts by weight of the glycidyl polyether of bis (4-hydroxy phenyl) dimethyl methane having a molecular weight of about 400 and an epoxy equivalent of about 200.

References Cited

UNITED STATES PATENTS 2,906,723  9/1959  Reese _____ 260—47
2,908,664  10/1959  Belanger et al. _____ 260—78.4

WILLIAM H. SHORT, *Primary Examiner.*

R. T. LYON, L. QUAST, *Assistant Examiners.*